Sept. 23, 1969     T. A. STANSBURY     3,469,079
NAVIGATIONAL AID
Filed April 15, 1963     2 Sheets-Sheet 1
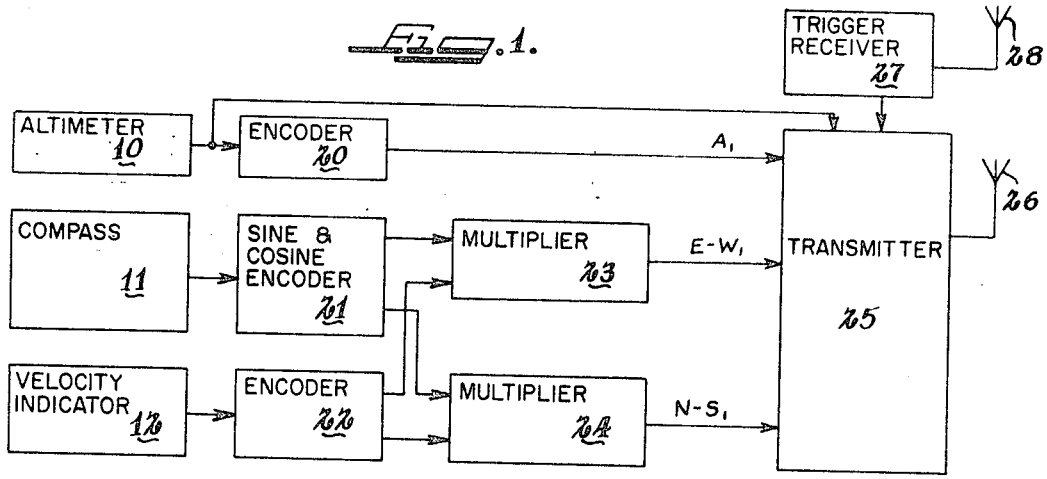
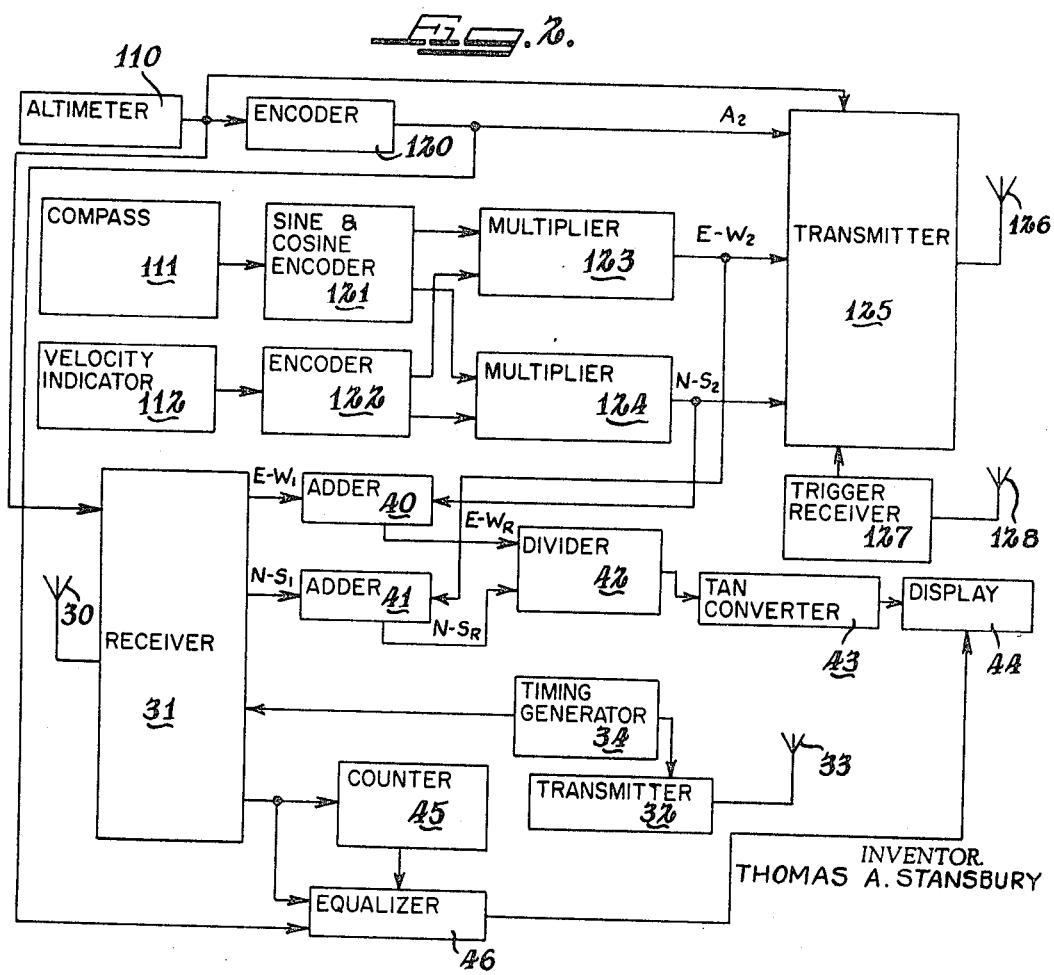
INVENTOR.
THOMAS A. STANSBURY

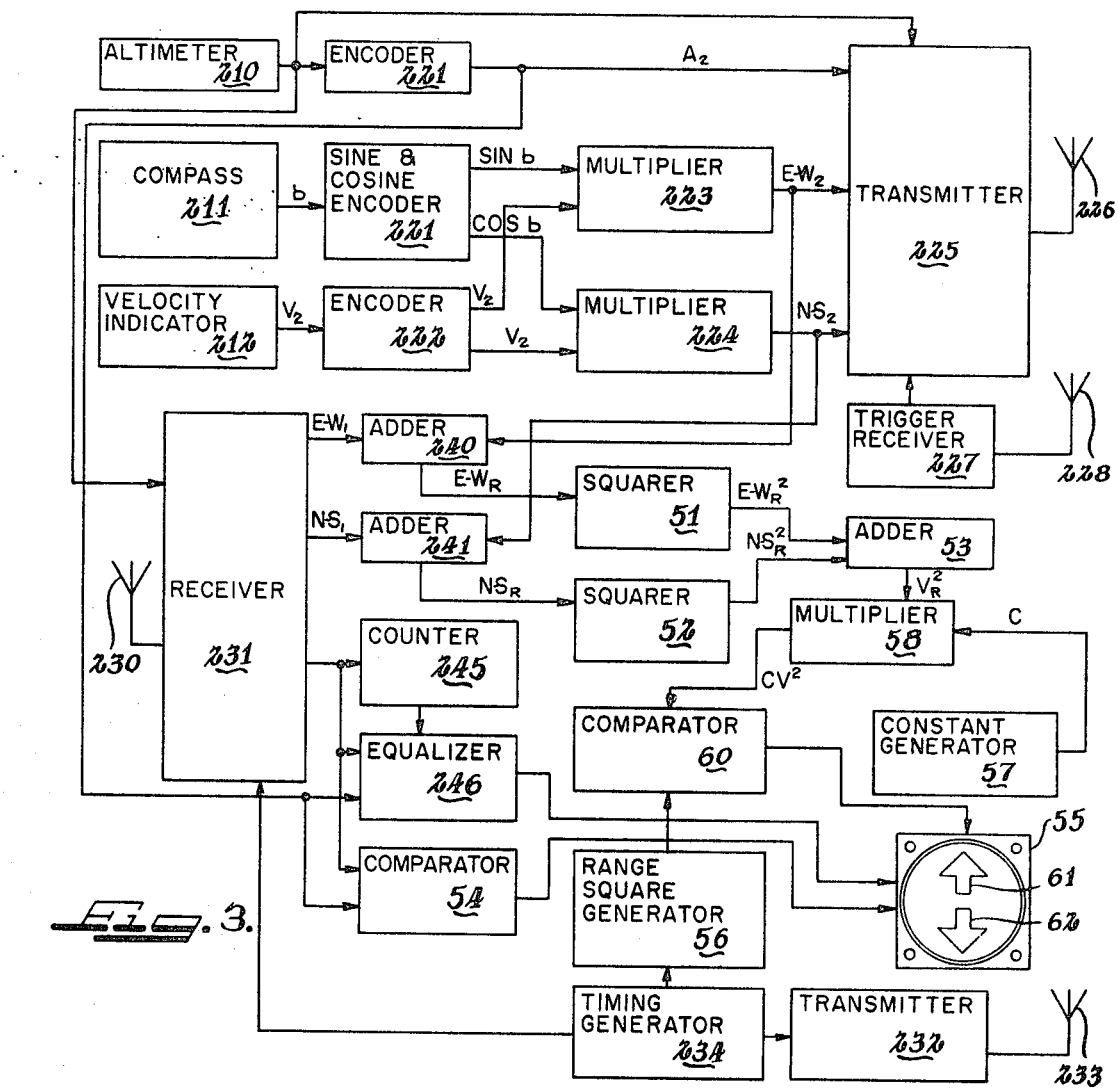
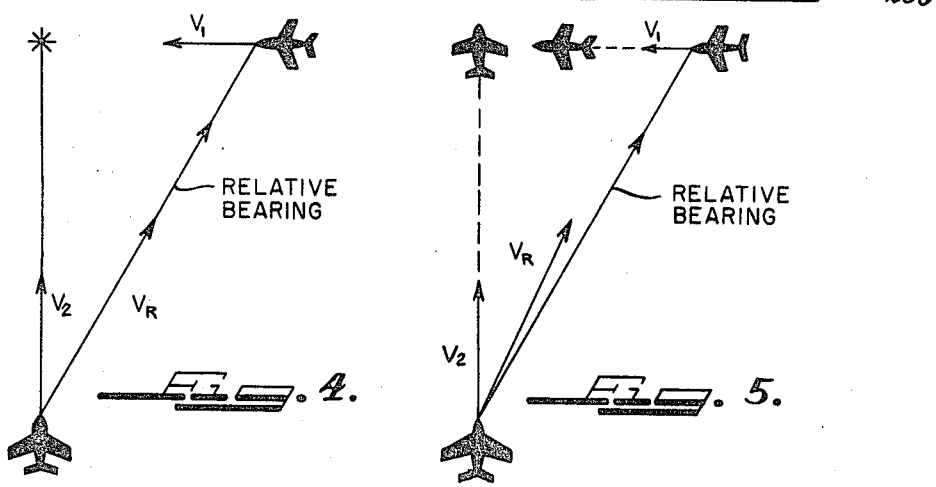

United States Patent Office 3,469,079
Patented Sept. 23, 1969

3,469,079
NAVIGATIONAL AID
Thomas A. Stansbury, 20 N. Wacker Drive,
Chicago, Ill. 60606
Filed Apr. 15, 1963, Ser. No. 273,219
Int. Cl. G06f *15/48;* G06g *7/76, 7/78*
U.S. Cl. 235—150.23                6 Claims

ABSTRACT OF THE DISCLOSURE

A Pilot Warning Instrument which computes the relative velocity vector direction between crafts; displays this direction so that the operator of a craft, if in visually observing in the direction indicated, sees the other craft, he knows that the craft are on a collision course.

---

The present invention relates to navigational aids and more particularly to systems and methods for preventing collisions between moving craft and stationary obstacles. In the aircraft field, the need for devices which will aid in the prevention of collisions between aircraft and between aircraft and stationary obstructions such as mountainous terrain and tall towers has become well recognized. In becoming better recognized, the need for two distinct types of devices has evolved. The first is known as a Pilot Warning Instrument (PWI). It is any device providing the pilot of an aircraft with the relative bearing of another aircraft which is a hazard. The Pilot Warning Instrument is primarily useful under visual flight rule conditions because it merely gives the pilot the relative bearing of another aircraft so that he may visually observe it, and, from his observation, make whatever decision he feels is appropriate to avoid a potential collision. The second type of device is known as a Collision Avoidance System (CAS). It detects the presence of potential collision hazards in the form of other aircraft or stationary obstacles, computes the relative movement of the hazard, and provides the pilot with instructions for avoiding the hazard. The Collision Avoidance System may also include circuits for issuing control signals to an automatic pilot so that any collision avoidance action which the collision avoidance system calculates may be carried out via a direct autopilot connection without requiring any action on the part of a pilot.

A number of Pilot Warning Instruments and Collision Avoidance Systems have been developed, but all thus far developed have had limitations which have made them impractical for use in general aviation. The present invention overcomes these past limitations and provides both a Pilot Warning Instrument and a Collision Avoidance System. One of the principal problems in these systems is that of obtaining a practical directional antenna which can obtain bearing information of hazards. In attempting to avoid the need for a directional antenna, a ground bounce radiation technique has been developed wherein the time lag of a reflected RF pulse behind a directly received pulse from a transmitter is measured. However, this technique is severely limited in that it cannot be utilized at low altitudes where the danger of aircraft collision is highest. The present invention overcomes the requirement for a directional antenna by providing a position warning indicator wherein relative bearings of hazards are computed without the use of a directional antenna and a collision avoidance system which is operable at all altitudes without requiring relative bearing information of the hazards involved.

It is, therefore, an object of the present invention to provide a new and improved navigational aid.

Another object is to provide a Pilot Warning Instrument wherein bearing information of a hazard is obtained without the use of a directional antenna.

A further object is to provide a collision Avoidance System which does not require bearing information of a collision hazard and is usable at all altitudes.

Yet another object is to provide a Pilot Warning Instrument which derives the relative velocity vector direction between two craft by obtaining the velocity vectors of both craft and computing the relative velocity vector direction.

A still further object of the present invention is to provide a Collision Avoidance System which calculates the probability of a collision from the velocity vectors of the two craft to obtain a relative velocity vector magnitude and comparing it with the range between the two craft.

Further objects and advantages will become apparent from the following detailed description taken in connection with the accompanying drawings, in which:

FIGURE 1 is a schematic diagram of a preferred form of transmission device in accordance with the present invention for either a Pilot Warning Instrument or a Collision Avoidance System.

FIGURE 2 is a schematic diagram of a preferred form of a Pilot Warning Instrument installation in accordance with the present invention.

FIGURE 3 is a schematic diagram of a preferred form of a Collision Avoidance System installation in accordance with the present invention.

FIGURE 4 illustrates the trigonometry of a typical state of circumstances which may lead to the collision of two craft; and FIGURE 5 illustrates the trigonometry of a typical state of circumstances which do not lead to the collision of two craft.

While this invention is susceptible of embodiment in many different forms, there is shown in the drawings and will herein be described in detail, embodiments of the invention with the understanding that the present disclosure is to be considered as an exemplification of the principle of the invention and is not intended to limit the invention to the embodiments illustrated. The scope of the invention will be pointed out in the appended claims.

The present invention encompasses both a Pilot Warning Indicator and a Collision Avoidance System which utilize a common transmission device for each craft which may be utilized in either a Pilot Warning Instrument installation or a Collision Avoidance System to perform the respective functions of each type of device. Thus, all craft cooperating to utilize the present invention would be equipped to carry the transmission device illustrated in FIGURE 1 in order that all would transmit required information, and each craft, at its option, could utilize either or both the Pilot Warning Instrument installation shown in FIGURE 2, or the Collision Avoidance System installation shown in FIGURE 3. Thus, a craft could participate in a general collision avoidance system by merely carrying the transmitter portion of FIGURE 2, or it could obtain desired collision avoidance information from either a Pilot position Warning Instrument installation indicator or Collision Avoidance System installation, or if both types of collision avoidance information are desired, it could carry a combined Pilot Warning Instrument and Collision Avoidance System installation. Thus, the cost and complexity of the equipment installed in each craft may be tailored to the speed, maneuverability and type of collision avoidance information desired to be obtained aboard the craft.

Referring now specifically to the transmission device illustrated in FIGURE 1, a precision altimeter 10, a compass 11 and a velocity indicator 12 are connected respectively to a binary encoder 20, a sine and cosine binary encoder 21 and a binary encoder 22 in order to generate the altitude of a first aircraft, its heading or course by north-south and east-west components and its velocity in the form of a binary code. The compass 11 may be any form of a high accuracy compass such as a gyro compass or a flux gate compass. A binary multiplier circuit 23 is connected to encoder 21 to receive a binary code signal indicative of the sine of the heading of the aircraft and to encoder 22 to receive a signal indicative of the velocity of the aircraft. These are combined in multiplier 23 to produce an east-west velocity vector component in the form of a ten bit binary word. In a similar manner, a multiplier 24 is connected to encoder 21 to receive a binary signal indicative of the cosine of the heading and is connected to encoder 22 to receive the signal indicative of velocity to calculate a ten bit north-south velocity vector component. A telemetering type transmitter is connected to the encoder 20, multiplier 23, and multiplier 24 to place the three ten bit binary code signals of altitude $A_1$, the east-west velocity vector $E-W_1$ and the north-south velocity vector $N-S_1$ on subcarriers which are, in turn, modulated on the carrier wave generated by the transmitter. The RF oscillator generating the carrier wave is connected to the altimeter 10 in order that the frequency of the transmitter may be varied in accordance with the altitude as the craft climbs and descends. The transmitter 25 is connected to an omnidirectional antenna 26 for the purpose of radiating the carrier wave with its three subcarriers in pulses each being sufficiently long to contain the ten bits of binary code on the subcarriers. Thus, the radiated signal contains a general indication of altitude in the frequency of the carrier wave and also a more specific altitude signal in the ten bit binary code modulated on the first subcarrier. A trigger receiver 27 is connected to an omnidirectional antenna 28 mounted on the first aircraft, to receive interrogation pulses from other craft, and connected to transmitter 25 to trigger it when an interrogation pulse is received from another craft. Whenever transmitter is so triggered, it emits through antenna 26 one pulse containing the three binary code signals of altitude, east-west component and north-south component on the subcarriers. The equipment thus far described as installed in a first craft completes a "minimum station" when so installed in a craft to allow it to be recognized by other craft equipped with a system as is illustrated either in FIGURE 2 or 3.

Referring now to FIGURE 2, a second aircraft is equipped with a PWI installation which not only transmits signals containing altitude and velocity vector component information, but also receives such information from other aircraft in order to compute the magnitude of the relative velocity vector between itself and the other aircraft. It includes an altimeter 110, a compass 111, and a velocity indicator 112 connected to a set of binary encoders 120–122 which are equivalent to altimeter 10, compass 11, velocity indicator 12, and encoders 20–22, respectively. Binary multipliers 23 and 24 are connected to encoders 121 and 122 in a manner similar to multipliers 23 and 24 to produce the east-west $E-W_2$ and north-south $N-S_2$ velocity components of the velocity vector of this second craft. A telemetering transmitter 125 and trigger receiver 127 perform the same functions as telemetering transmitter 25 and trigger receiver 27 in securing altitude and velocity component information and radiating it in the form of a carrier with three subcarriers through an antenna 126 when an interrogation pulse is received on antenna 128.

An omnidirectional receiving antenna 30, mounted on the second craft, is connected to a telemetering type receiver 31 which receives and demodulates the subcarriers of a pulse signal from antennas 26 if the first craft is radiating a carrier wave which has a frequency which is indicative of an altitude within several thousand feet of the alttude indicated by altimeter 110 on the second craft. Altimeter 110 is connected to receiver 31 to control a bandpass tuning control of the receiver so that altitude signals which are indicative of altitudes within several thousand feet of the altitude indicated by altimeter 110 pass through a variable bandpass tuning filter. Those that do pass have the binary code on the three subcarriers demodulated. Thus, the frequency of the radiated carrier wave and the tuning of the bandpass filter and telemetering receiver 31 prevent the Pilot Warning Instrument installation from being jammed by an excessive number of transmissions which are received simultaneously. The formula for computing the direction of the relative velocity vector between the first and second craft is:

$$\theta = \arc\tan\left(\frac{V_1 \sin a - V_2 \sin b}{V_1 \cos a - V_2 \cos b}\right) \quad (1)$$

where:

$V_1$ is the magnitude of the velocity vector of the first craft;

$V_2$ is the magnitude of the velocity vector of the second craft;

$a$ is the heading of the first craft;

$b$ is the heading of the second craft; and, therefore, $V_1 \sin a$ is the east-west velocity component of the first craft $E-W_1$;

$V_1 \cos a$ is the north-south velocity vector of the first craft $N-S_1$;

$V_2 \sin b$ is the east-west velocity vector of the second craft $E-W_2$; and $V_2 \cos b$ is the north-south velocity vector of the second craft $N-S_2$.

Those skilled in the art are familiar with the fact that if two craft are on a potential collision course, that the relative bearing of the one craft from the other will remain constant. When the bearing of another craft remains constant, the direction of the relative velocity vector between the two craft coincides with the constant relative bearing. If the direction of the relative velocity vector differs slightly from the relative bearing, the two craft will have a near miss. The present invention utilizes the fact that the direction of the relative velocity vector is approximately equal to the relative bearing between the two craft whenever there is a probability of a collision or a near miss between the two craft. Thus indicating the direction of the relative velocity vector to a pilot of one craft is equivalent to indicating the approximate bearing of the other craft. When he has been given this information, he may immediately visually turn his attention to that approximate bearing to effect an immediate visual contact with the first craft. A typical collision situation is illustrated in FIGURE 4, and a typical near miss situation is illustrated in FIGURE 5. Whenever there is a large variance between the relative bearing of one aircraft from another and the direction of the relative velocity vector between them, no possibility of even a near miss will exist. However, for two aircraft to arrive anywhere in the vicinity of each other, they must, of necessity, be either on steady courses which will eventually bring them into either a collision situation or a near miss situation. Even in the situation where aircraft are changing their headings, frequently such as in a situation where one or both are executing various acrobatic type maneuvers, their average velocity vector over a period of time must be such that they are brought closer together. When two craft finally arrive at a sufficiently short range that either further maneuvering or the courses which they are making good at that time will bring them into a collision situation, the pilot of at least one and preferably both aircraft should be warned and given a bearing for visual contact of the other craft. In order to eliminate the situation of two craft actuating an alarm portion of the PWI when the two craft are far apart and thus may never be a hazard to one another, the transmission device illustrated in FIGURE 1 has its antenna 28 for receiving interrogation signals connected to the trigger generating receiver 27, which is, in turn, connected to transmitter 25 to trigger it whenever it receives an interrogating pulse as aforementioned. The system illustrated in FIGURE 2 on the second aircraft, includes an interrogating transmitter 32 connected to an omnidirectional antenna 33, which periodically emits triggering pulses which are received by antenna 28. These signals are transmitted by transmitter 32 in accordance with timing pulses received from timing generator 34. The timing generator 34 sends a trigger pulse to transmitter 32 and then allows sufficient time for reply data signals to be received from all aircraft within a dangerous range to be received by telemetering receiver 31. By so limiting the range of received data signal, the possibility of the PWI giving a "false alarm" is reduced to a practical minimum, and at the same time, situations wherein the relative velocity vector is not within a few degrees of the relative bearing between two aircraft, is practically eliminated. The danger range may vary from about three miles for a small, low-speed aircraft to the order of thirty miles for a high-speed jet.

The multipliers 123 and 124 provide the east-west $E-W_2$ and the north-south $N-S_2$ velocity components of the second aircraft. These quantities are available to a pair of conventional binary adders 40 and 41, respectively, which are constructed for subtraction. These adders periodically receive and store the velocity components of the second aircraft through suitable connections. They are connected to the receiver 31 so that when a signal is received from the second aircraft, the receiver 31 demodulates the velocity vectors of the first aircraft and sends east-west component to adder 40 to subtract it from the first aircraft's east-west component and sends the first aircraft's north-south component to adder 41 to subtract it from the second aircraft's north-south components. Thus, the adder 40 provides a resultant signal to a conventional binary divider 42 which is the east-west component $E-W_R$ of the relative velocity vector between the first and second aircraft, and adder 41 provides a signal to divider 42 which is the north-south component $N-S_R$ of the relative velocity vector between the two craft. The divider 42 provides the necessary division, as indicated in Formula 1 to provide tangent $\theta$ to a tangent converter 43 which, in turn provides the angle $\theta$ to a display unit 44. The display unit 44 is a binary to decimal type display having a multiple of decimal units so that the direction of the relative velocity vector between the two aircraft is visually displayed as a decimal number and retained for a predetermined period of time. Thus, a pilot of the second craft is made aware of the hazard, and he has time to read the display to obtain the necessary approximate relative bearing of the hazard. The display also incorporates an audio or visual alarm which attracts the pilot's attention to the fact that information from a potential hazard has been received.

In order to eliminate aircraft which are not cruising with 1000 feet of the second aircraft, an additional altitude circuit is provided which consists of a binary three-bit counter 45 and a binary equalizer 46 which are connected to the receiver 31 to receive the binary coded altitude signal which is a standard binary code giving altitude above sea level at intervals of 100 feet. Each time a new code signal is received, counter 45 counts off the first three bits, and during this time, sends a signal to equalizer 46 which disables it during this period of time. Equalizer 46 is connected to the binary encoder 120 which is connected to altimeter 110 to encode the altitude of the second aircraft in binary form. The equalizer 46, upon receiving an altitude code signal from receiver 31, being held inoperable during the first three bits by counter 45, is unable to compare the first three bits of the received encoded signal with the first three bits of the second aircraft encoded signal. Beginning with the fourth bit of both the first and second aircraft altitude codes, the equalizer compares the bits to determine whether they are similar. If the remaining seven bits of the ten bit code are each respectively similar, indicating equal altitudes within the range of 1,400 feet, the equalizer 46 produces an actuation signal on an output terminal which is connected to the alarm circuits in the display unit 44 so that they will be actuated only when they receive both the angle $\theta$ indication signal from the divider 42 through the converter 43 and the actuation signal from the equalizer 46.

Referring now to FIGURE 3, a Collision Avoidance System installation is illustrated in which components which are similar to the components found in the transmission device illustrated in FIGURE 1, and the Pilot Warning Instrument illustrated in FIGURE 2, have corresponding numbers. For the purpose of illustration, it is assumed that this installation is installed in the second aircraft rather than the installation shown in FIGURE 2. It will be observed that the transmission device is similar to that illustrated in FIGURES 1 and 2. It operates in the same manner as previously described for the transmission device (10–28) of FIGURE 1 and the transmission device portion (110–128) of FIGURE 2. An altimeter 210 has an output which is encoded by an encoder 221 into the ten bit binary altitude code; a compass 211 has an output connected to a sine and cosine encoder 222 to provide the sine of the aircraft heading $b$ to a multiplier 223 and a cosine function of the aircraft heading $b$ to a multiplier 224, and a velocity indicator 212 has the second aircraft's velocity $V_2$ encoded by an encoder 223 to provide the binary code to both multipliers 223 and 224. In order to modulate the subcarriers of carrier signal pulses transmitted by a data transmitter 225 in binary code with altitude $A_2$, east-west velocity vector of the aircraft's velocity $E-W_2$ and north-south velocity vector of the aircraft velocity vector $N-S_2$; encoder 221, multiplier 223 and multiplier 224 are connected to transmitter 225. Carrier signal pulses are radiated from an antenna 226. For the purpose of triggering the carrier pulses containing this information for reception by other aircraft, an antenna 228 is connected to a trigger receiver 227, which is, in turn, connected to the data transmitter 225 to trigger the carrier pulse which has the altitude and east-west and north-south components of the aircraft's velocity vector modulated thereon.

For the purpose of receiving such information from aircraft similarly equipped, a trigger transmitter 232 is connected to a timing generator 234 in order to periodically trigger the transmitter 232 to transmit interrogation pulses through its antenna 223. The interrogation pulses are such as the first aircraft which send a reply information pulse through a data transmitter such as 25, 125 and 225 with the altitude and relative velocity north-east and north-south components modulated on subcarriers. An antenna 230 receives such signals. A data receiver 231 demodulates the altitude binary code, and the east-west and north-south velocity vectors. An adder 240 is connected to the data receiver for receiving the east-west velocity vector $E-W_1$ of another aircraft which again is assumed to be the aforementioned first aircraft, and to the multiplier 223 for receiving the east-west velocity vector $E-W_2$ of the second aircraft in order to algebraically add these east-west velocity vector components together and provide the resultant component $E-W_R$ to a conventional binary squarer circuit 51. In a like manner, an adder 241 is connected to the data receiver 231 to receive the north-south velocity vector component $N-S_1$ of the first aircraft and to the multiplier 224 to receive the north-south velocity component $N-S_2$ of the second aircraft to provide a resultant north-south velocity vector component $N-S_R$ to a conventional binary squarer circuit 52. A binary adder 53 is connected to the squarer circuit 51 to receive a binary code signal representing a square of the east-west component of the relative velocity $(E-W_R)^2$ and to the squarer circuit 52 to receive a binary code signal representing the north-south component of the relative velocity $(N-S_R)^2$ between the two aircraft. The binary added 53 adds the squares of the two rectangular components to produce a binary code signal which is the relative velocity of the two aircraft squared $V_R^2$.

The demodulated altitude signal $A_2$ in the form of a binary code is transferred from the data receiver 231 to a three bit counter 245, to an equalizer 246 and to a binary code comparator 54. The three bit counter 245 is connected to the equalizer 246 to transfer a signal to the equalizer 246 which allows it to commence its equalizing function of comparing the altitude of the second aircraft with the altitude of the first aircraft after the first three bits have passed, which, in effect, compares the altitude of the two aircraft to determine whether they are within 1,400 feet of each other. The equalizer 246 is connected to the output of the encoder 221 to receive the ten bit altitude code representing the altitudes of the second aircraft. If the two aircraft are found to be within 1,400 feet of each other, as determined by equalizer 246, a signal is generated which is transferred through a connection to a display unit 55, which will activate the display unit 55, as will presently be described in greater detail. The comparator 54 is similarly connected to the output of the encoder 221 to receive the second aircraft's altitude in addition to the first aircraft's altitude in order to compare them and determine which aircraft is above the other. The comparator 54 is connected to the display unit 55 for the purpose of sending, either a signal which indicates that the second aircraft is above the first aircraft, or a signal indicating that it is below the first aircraft.

The timing generator 234 issues a timing trigger pulse to a range square generator 56 at the same time it issues a trigger pulse to the trigger transmitter 232 so that the range square generator commences to generate a binary code signal $r^2$ which is equal to the square of the range between the second aircraft and the first aircraft from which a reply signal is received on antenna 230.

A constant generator 57 which generates a constant binary code signal C and an output of the adder 53 are both connected to a conventional binary multiplier 58 to produce a signal $CV_R^2$ which is equal to the relative velocity squared multiplied by the constant C.

An output of the adder 53 is connected to a comparator 60 and an output of the range square generator 58 is also connected to the comparator 60 in order that the comparator may compare the binary code signal which represents the square of the range between the two craft $r^2$ and the binary code signal of the constant and the square of the relative velocity between the two aircraft at that moment $CV_R^2$. If the constant times the square of the relative velocity $CV_R^2$ is greater than the square of the range $r^2$ the comparator 60 issues an actuating signal to the display unit 55. Whenever the display unit 55 receives a signal from the equalizer 246, indicating that another aircraft is within 1,400 feet of the second aircraft, and a signal from the comparator 60 that $CV_R^2$ is less than $r^2$, it sounds an audio in unit 55 and illuminates either an arrow 61 or an arrow 62 on the face of display unit 55, to indicate that a possible collision is imminent. If the signal from the comparator 55 indicates that the first aircraft is below the second aircraft, then the arrow 61 will be illuminated indicating that the avoidance maneuver is a climb. If the first aircraft is above the second aircraft, the arrow 62 is illuminated to indicate that the collision avoidance maneuver is a dive.

If two aircraft are actually on collision courses the time T to the point of collision is represented by Equation 2.

$$T = \frac{r}{V_R} \quad (2)$$

wherein:

$r$ = the range between two aircraft at any given time and
$V_R$ = the relative velocity vector between the aircraft at the given time.

If two aircraft are not on collision courses, T will remain relatively large because they will not close the range between them until they are a hazard to each other. Therefore, T may be utilized as a measure of the development of a potential collision situation. When it reaches a relatively low value, evasion maneuvers should be taken to prevent a collision. This value should be large enough to allow sufficient time for any one aircraft to take evasive action to avoid a collision even if the other involved aircraft does not aid in the evasive action. It may vary with the performance of the aircraft involved. A value that has been generally accepted in civil aviation to include high performance jet transport aircraft is 45 seconds. Whenever T is equal to or less than K, a collision hazard exists between the two aircraft involved. If $K^2$ is made equal to another constant C, then a collision hazard exists whenever C is equal to or greater than $T^2$ as indicated in Equation 3

$$C \geq T^2 = \frac{R^2}{V_R^2} \quad (3)$$

Therefore, $$C \geq \frac{R^2}{V_R^2} \quad (4)$$

indicates that a collision hazard exists between two aircraft. This is the criterion utilized by the system illustrated in FIGURE 3 to determine whether a potential collision exists between two given aircraft. It may be observed that the quantities C, $V_R^2$ and $r^2$ may be algebraically transposed in any form that will allow a comparison of the three quantities. For the system illustrated in FIGURE 3, the quantities are transposed so that $CV_R^2$ is equal to or greater than $r^2$. As illustrated, the east-west and north-south components of the relative velocity are produced by adders 240 and 241 as they were by the adders 40 and 41 in the Pilot Warning Instrument system illustrated in FIGURE 2. These two components of the relative velocity are squared by the binary squarer circuits 51 and 55 and added algebraically in the adder 53 to accomplish the following equation of:

$$V_2^2 = (N - S_R)^2 + (E - W_R)^2 = (E - W_1 - EW_2)^2 + (NS_1 - NS_2)^2 \quad (5)$$

The range square generator 56 provides a continuous output of $r^2$ which is multiplied with the constant C received from the constant generator 257 in the multiplier 258 to produce the quantity $CR^2$. As previously mentioned, the comparator 260 compares the product $CV_R^2$ to $r^2$ to determine whether the product $CV_R^2$ is larger than the square of the range, and if $CV_R^2$ is larger than $r^2$, an actuating signal is issued by the comparator 60 to the display unit 55. Since the display unit 55 is simultaneously receiving a signal from the equalizer 246 to determine whether the other aircraft is within a dangerously close altitude of the other aircraft and is receiving a relative comparison of aircraft from the comparator 54, it may utilize either the arrow 61 or 62 to warn the pilot to either climb or dive to avoid the other aircraft.

In order to avoid saturating the receiver 231 which contains a variable bandpass filter, it is connected to the altimeter 210, for the purpose of excluding information signals from all aircraft which are at a significantly different altitude than own aircraft. As a further method of preventing saturation of the receiver, it is connected to timing generator 234 so that it receives a signal from the timing generator after a sufficient period of time has elapsed to receive any possible signals within the longest possible potential hazardous range of another aircraft has elapsed.

If every aircraft operating in a given area of the atmosphere were to carry either the "minimum station" illustrated in FIGURE 1, the Pilot Warning Instrument installation illustrated in FIGURE 2, or the Collision Avoidance System installation illustrated in FIGURE 3, all such aircraft would be able to cooperate with each other. The aircraft carrying the "minimum station" of FIGURE 1 make their presence and necessary data available to all other aircraft so that they may take steps to avoid them. The aircraft equipped with the Pilot Warning Instrument installation are able to receive a warning and bearing indication of hazardous aircraft. The aircraft equipped with the Collision Avoidance system installation are able to react to the collision avoidance instructions produced by that system either manually or automatically, for the signals utilized to initiate arrows 61 and 62 may be utilized to control an automatic pilot and cause an aircraft to automatically climb or dive. Since the components of the systems illustrated in the Pilot Warning Instrument installation illustrated in FIGURE 2 and the Collision Avoidance System installation illustrated in FIGURE 3 are similar, except for a relatively few units, a combined Pilot Warning Instrument and a Collision Avoidance System can be provided by connecting the components of FIGURE 3, not found in FIGURE 2, to the appropriate common components found in FIGURE 2. Thus, a fourth system is provided which is within the scope of the present invention. Its complexity and weight is only slightly greater than either the Pilot Warning Instrument installation or the Collision Avoidance System installation alone.

Although the collision avoidance systems illustrated utilize the transmission of the north-south and east-west components of each craft's velocity, which are velocity components perpendicular to each other, the scope of the present invention includes the utilization of the described installations with any preselected pair of perpendicular velocity vectors for the aircraft operating in the system. The scope of the present invention also includes the transmission of data by means other than perpendicular velocity components such as the direct transmission of velocity and course or heading between aircraft which may be resolved at the receiving aircraft into perpendicular components before applying them to the special circuits of either the Pilot Warning Instrument installation or the Collision Avoidance System installation. Such systems will operate with any or all of the systems specified in my co-pending application Ser. No. 448,554, filed Apr. 1, 1965. In such systems, the heading or course and the velocity of a first aircraft would be fed to a rectangular component resolver of any design well known to those skilled in the art to provide the perpendicular components. These rectangular components resulting from the resolver could then be combined with the rectangular components, provided on the second craft, as illustrated by FIGURES 2 and 3. Further, in some instances, it may be desirable to receive course and velocity information from a first aircraft and to resolve it into perpendicular components with one component parallel with the heading or velocity vector component of a second aircraft.

Any one of the four types of installations may be utilized in conjunction with a stationary object. The transmitter used for a stationary point would emit signals, when triggered, indicating zero velocity and the altitude of the point.

I claim:

1. In a proximity warning indicator, the combination of:
a transmitter generating signals indicative of the rectangular components of a first craft velocity vector,
a receiver means receiving said signals indicative of the rectangular components of the first craft velocity vector,
means on said second craft for generating signals indicative of the rectangular components of a second craft velocity vector,
computer means connected to said receiver means and to said means for generating signals on said second craft to combine corresponding rectangular components of the first and second craft velocity vectors to obtain a relative velocity vector between said craft, said computer means requiring no other inputs to calculate the relative velocity vector between said craft, and
display means responsive to the relative velocity vector obtained by said computer means for indicating the approximate relative bearing of said first craft from said second craft that must exist if said first craft is to be a navigational hazard to said second craft.

2. A computer comprising:
first means for combining signals representative of a first component of a first craft's velocity vector and a parallel first component of a second craft's velocity vector to obtain a signal representative of a first component of a relative velocity vector having a direction,
second means for combining signals representative of a second component of said first craft's velocity vector which is perpendicular to said first component and a parallel second component of said second craft's velocity vector to obtain a signal representative of a second component of the relative velocity vector,
third means connected to said first and second means for combining the signals representative of said first relative velocity vector component and said second relative velocity vector component to obtain a signal representative of the relative velocity vector direction,
fourth means connected to said third means for displaying said relative velocity vector direction, said fourth means requiring no other input to display said relative velocity vector direction, and
fifth means for preventing operation of said fourth means whenever the range between said craft is less than a predetermined value.

3. A computer comprising:
first means for combining a signal representative of a first component of a first craft's velocity vector and a parallel first component of a second craft's velocity vector to obtain a signal representative of a first component of a relative velocity vector having a direction,
second means for obtaining a value representative of a second component of said first craft's velocity vector which is perpendicular to said first component and a parallel second component of said second craft's velocity vector to obtain a signal representative of a second component of the relative velocity vector,
third means connected to said first and second means for combining the signals representative of said first relative velocity vector component and said second relative velocity vector component to obtain a signal for the relative velocity vector direction,
fourth means for combining a signal indicative of the altitude of said first craft with a signal indicative of the altitude of said second craft to determine whether said craft are in a position to be potential hazards to each other,
fifth means connected to said third and fourth means for displaying the relative velocity vector direction, whenever said means for combining altitudes determines a potential hazard exists, and
sixth means for preventing operation of said fifth means whenever the range between said craft is less than a predetermined value.

4. A computer comprising:
first means for combining signals representative of a first component of a first craft's velocity vector and a parallel first component of a second craft's velocity vector to obtain a signal representative of a first component of a relative velocity vector having a direction,
second means for combining signals representative of a second component of said first craft's velocity vector which is perpendicular to said first component and a parallel second component of said second craft's velocity vector to obtain a signal representative of a second component of the relative velocity vector, third means for combining signals representative of a second component of said first craft's velocity vector which is perpendicular to said first and second components and a parallel third component of said second craft's velocity vector to obtain a signal representative of a third component of the relative velocity vector, fourth means for combining the signals representative of said first, second, and third relative velocity vector components to obtain a value for the relative velocity vector direction, fifth means connected to said fourth means for displaying said relative velocity vector direction, said fifth means requiring no other input to display said relative velocity vector direction, and sixth means for preventing operation of said fifth means whenever the range between said craft is less than a predetermined value.

5. A proximity warning indicator system comprising:

a transmitter on a first craft for generating signals indicative of a first craft's velocity vector, first means on a second craft for generating signals indicative of a second craft's velocity vector, second means on said second craft for receiving said signals indicative of the first craft's velocity vector and connected to said first means for determination of the resultant vector velocity direction, and third means for preventing operation of said second means whenever the range between said craft is less than a predetermined value.

6. A proximity warning indicator system comprising:

a transmitter on a first craft for generating signals indicative of a first craft's velocity vector and its altitude, first means on a second craft for generating signals indicative of a second craft's velocity vector and its altitude, second means on said second craft for receiving said signals indicative of the first craft's velocity vector and connected to said first means for determination of the resultant vector velocity direction, third means for preventing operation of said second means whenever the range between said craft is less than a predetermined value, and fourth means on said second craft for preventing operation of said second means whenever there is a difference in altitude between said craft greater than a predetermined value.

References Cited

UNITED STATES PATENTS

| 2,428,800 | 10/1947 | Holden | 235—189 XR |
| 2,385,334 | 9/1945 | Davey | 235—189 |
| 3,071,767 | 1/1963 | Freedman | 343—112.4 |
| 3,095,566 | 6/1963 | Dethloff | 343—112.4 |
| 3,114,147 | 12/1963 | Kuecken | 343—112.4 |
| 3,208,064 | 9/1965 | Morrel | 343—112.4 |
| 3,227,862 | 1/1966 | Freedman | 343—112.4 |

EUGENE G. BOTZ, Primary Examiner

U.S. Cl. X.R.

235—189; 343—112.4